Mar. 20, 1923.　　　　　F. A. SHULER.　　　　　1,449,064.
BRAKE MECHANISM.
FILED JULY 5, 1921.　　　　　2 SHEETS—SHEET 1.
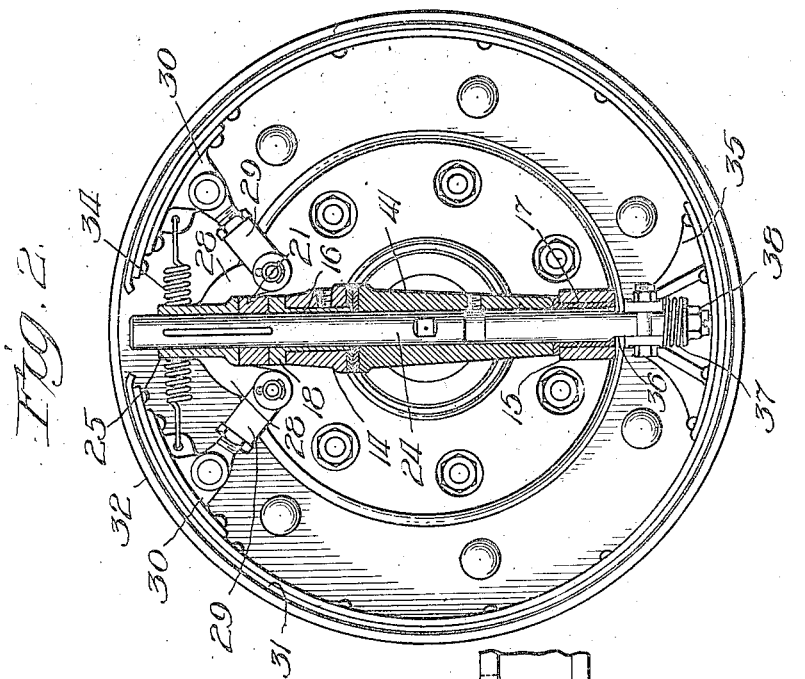
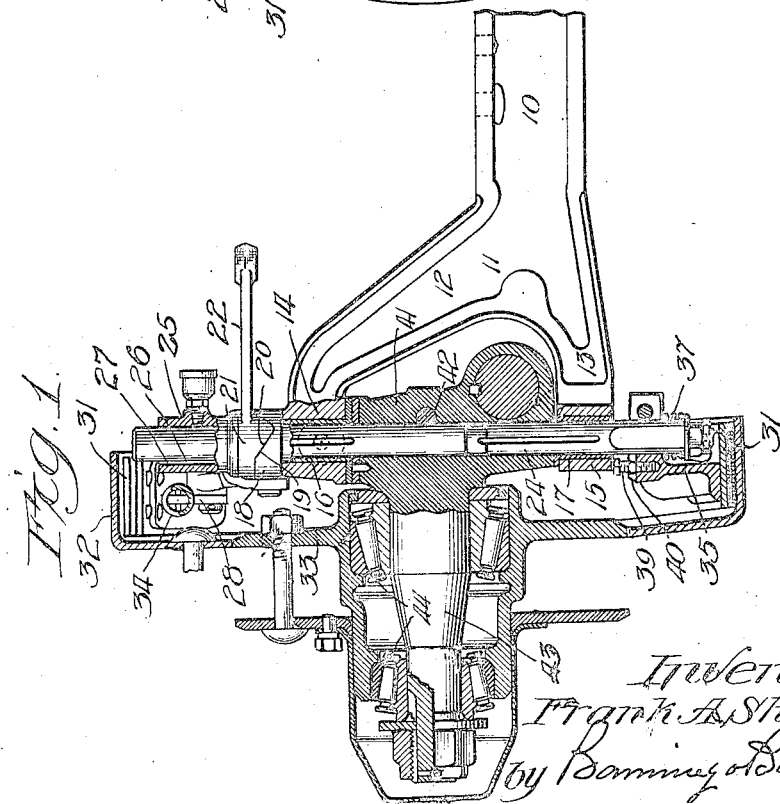
Inventor:
Frank A. Shuler
by Banning & Banning
Attys

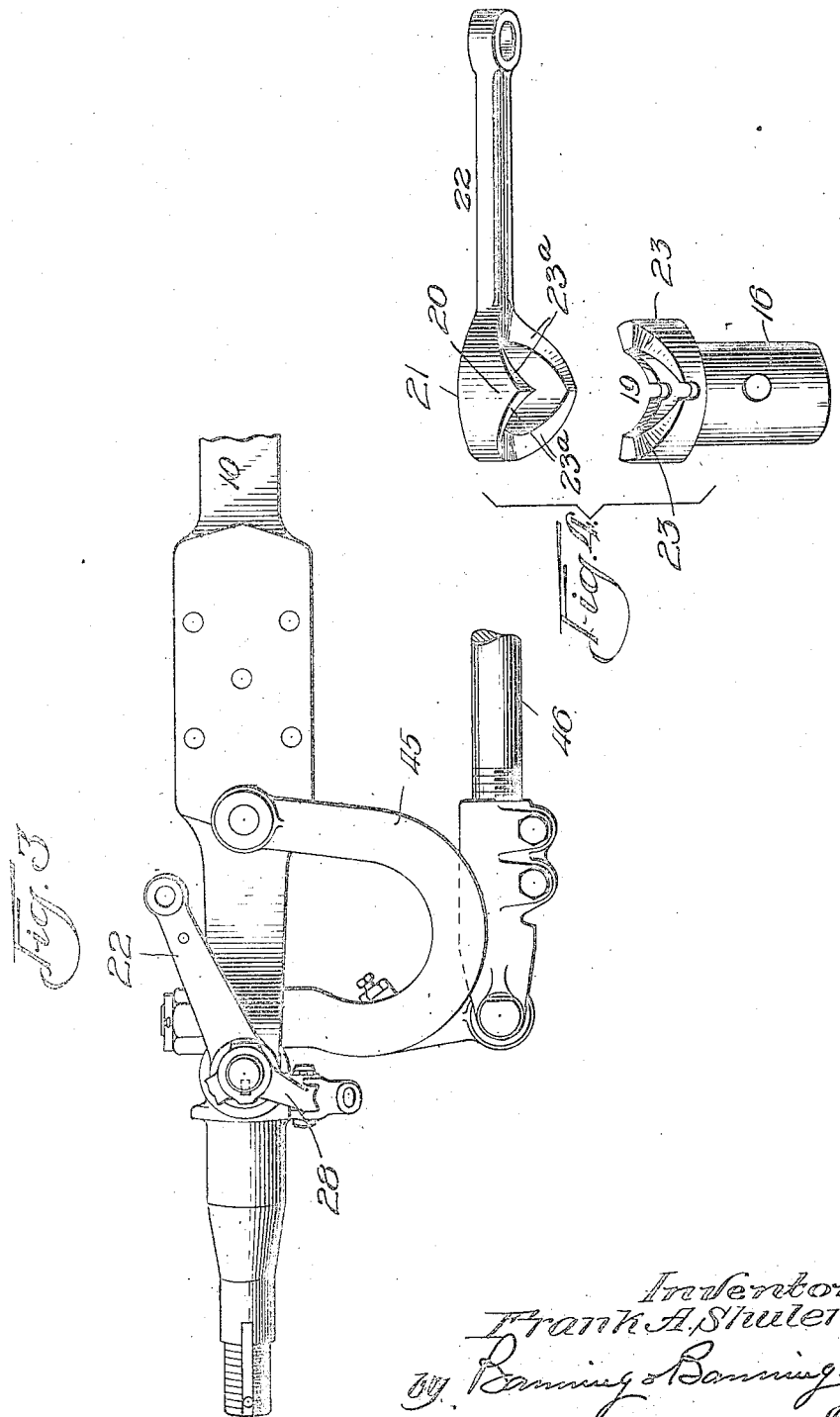

Patented Mar. 20, 1923.

1,449,064

UNITED STATES PATENT OFFICE.

FRANK A. SHULER, OF LOUISVILLE, KENTUCKY.

BRAKE MECHANISM.

Application filed July 5, 1921. Serial No. 482,426.

*To all whom it may concern:*

Be it known that I, FRANK A. SHULER, a citizen of the United States, residing at Louisville, in the county of Jefferson and State of Kentucky, have invented certain new and useful Improvements in Brake Mechanism, of which the following is a specification.

The brake mechanism of the present invention is designed for use on knuckle type axles for automotive vehicles and trailers.

The object of the invention is to so associate the brake mechanism with the pivotal mountings for the wheels that the braking effort may be applied regardless of the position assumed by the wheels in steering. With this end in view the brake actuating mechanism, or so much thereof as is involved in the imparting of the braking effect to the brake bands or the like, is mounted in coincident relation with the pivotal axis for the wheel spindles, so that the latter may be swung freely as is required in steering, without interfering with the mechanism involved in the braking operation.

Further objects will appear from a detailed description of the invention, which consists in the features of construction and combinations of parts hereinafter described and claimed.

In the drawings:

Figure 1 is an elevation partly in section of the front wheel mounting for an automobile;

Fig. 2 is a view partly in section taken on the pivotal axis for the wheel and looking outwardly toward the interior of the drum;

Fig. 3 is a plan view of the axle center yoke, pivotal mounting and wheel spindle, with the hub and brake drum removed; and Fig. 4 is a perspective view of the fixed and actuating cam elements in disassembled relation.

The brake mechanism of the present invention is primarily employed in connection with the front running gear of an automobile and is carried by a fixed axle 10 provided in each end with a yoke 11 having upper and lower arms 12 and 13 respectively, which arms terminate in upper and lower bosses 14 and 15 respectively, which is the usual practice in automobile construction. The bosses are vertically bored to provide for the reception of upper and lower bushings 16 and 17 respectively, which bushings are securely locked in the upper and lower bosses. The upper bushing 16 carries an enlarged head 18 which overlies the upper surface of the boss 14 and the head on its upper face is provided on each side with a substantially V-shaped notch 19, constituting cam surfaces for coaction with a pair of downwardly projecting wedge-shaped cams 20 formed on the lower face of a head 21 which carries a lever arm 22 adapted to be oscillated in any suitable manner to operate the brake mechanism.

The exact configuration of the coacting cam surfaces is best illustrated in Fig. 4, which shows the cams separated to illustrate the contour of each. It will be noted that each of the V-shaped notches 19 affords an obliquely sloping surface 23, the plane of which maintains a spiral progression from the top to the bottom so that the width of the plane at any point, measured in a radial direction, is maintained equal. This spirality of contour is a resultant of obliquely cutting the surface of the shell in a constantly varying plane, the transverse projection of the plane at any point being toward the vertical axis of the head.

The head 21, which constitutes the male member of the couple, has a complementary contour 23ª to that of the female member, the wedge shaped cam projections having a like spirality to that just described. When the parts are nested together the apex of each wedge projection will fit into the hollow of the complementary recess and a full contact of surface will be maintained throughout. When the male member is rotated, the apexes of the wedge shaped cams will ride up and away from the bases of the recesses, and though the area of contact will be progressively reduced the coincidence of contacting surfaces will be maintained and an easy riding fit insured in every position of adjustment.

The cam heads and bushings, from the nature of the operations involved, must maintain a fixed relation with respect to the axle yoke, irrespective of the steering angle of the wheel mountings, save in so far as the actuating male cam head is turned or adjusted in setting the brakes, and for this reason the upper and lower bushings are securely locked in the upper and lower bosses of the axle yoke, and serve as bearings for a vertically disposed knuckle pin 24 which passes through the bushings and through the cam heads which are alined therewith. The actuating male cam head is contacted by a brake operating sleeve 25 which is slidably mounted upon the knuckle pin though maintaining non-rotative engagement therewith through the medium of a key 26 which engages a vertical slot 27 cut in the inner wall of the sleeve, which sleeve is adapted to be moved up and down by contact as the same is adjusted.

The sleeve is provided on each side with a hanger 28 (see Fig. 2), each of which hangers has pivoted thereto a toggle link 29, said links being respectively pivoted at their outer ends to a pair of fittings 30 secured to the brake band 31 fitted to co-act with the interior of the drum 32, which latter is mounted on the hub 33. A coiled spring 34 connects the respective fittings and is adapted to be placed under tension as the ends of the brake band are spread in setting the brake against the drum, so that upon the release of the brake actuating mechanism the free ends of the brake band will be drawn inwardly and the brake released.

The lower end of the knuckle pin 24 carries an anchor 35 which is slidably mounted upon the knuckle pin, the sides 36 thereof being flattened to prevent any rotative displacement of the anchor. The anchor is riveted or otherwise secured to the brake band at its lower medial point and is normally held in elevated relation on the knuckle pin through the medium of a coil spring 37 which is interposed between the anchor and the nut 38 on the lower end of the pin. The normal position of the anchor upon the pin can be adjusted by means of a set screw 39 and the lock nut 40 which bear against the lower boss 15 of the axle yoke.

The knuckle pin is keyed or locked to the knuckle 41 by means of a cross pin 42, so that these parts will rotate in unison about an axis which is coincident with the center of the knuckle pin. The knuckle 41 carries an outwardly projecting axle 43 upon which the wheel hub 33 is mounted, the usual roller bearings 44 or the like being provided to reduce friction.

A steering arm 45 and a steering cross connection 46 are provided, as is the universal practice in an automobile of like construction.

In operation, with the parts in the positions indicated in the drawings the brake band will stand in released relation to the drum, and this relation will be maintained by the conjoint action of the upper spring 34 and the lower spring 37 which together serve to draw back the brake band and contract the same so that freedom from contact will be maintained.

When the arm 22 is turned by the action of the brake lever or pedal, the actuating cam head will ride up on the cam surfaces and will lift the sleeve 25, thereby spreading the toggle links and expanding the brake band, which expansion will in part serve to compress the lower spring 37 and thereby set the brake band evenly at all points against the drum. This action will be effected independently of the angular position of the wheels, since it will be observed that the female cam member with its associated bushing is maintained fixedly within the uppermost yoke boss and the male actuating cam head will be maintained against accidental rotation by the brake connections, the knuckle pin rotating freely within each of these members. The coacting of the parts is thus maintained independently of the angular adjustment of the wheels, so that the brakes may be properly applied at any time.

Although the parts have been described with particularity and in a form which fully satisfies the requirements of actual service, it is not the intention to limit the invention to precise details, since many of the latter may be modified without departing from the spirit of the invention.

I claim:

1. In a brake mechanism of the type described, in combination with a fixed axle, a pivoted knuckle and its associated axle with the wheel hub and drum rotatably mounted thereon, a vertical knuckle pin rigidly secured to the knuckle in coincidence with the axis thereof, a fixed cam member through which the knuckle pin passes, an actuating cam member loosely mounted upon the knuckle pin, a sleeve on the knuckle pin adapted to be moved longitudinally thereof by the engagement of the movable cam member, and braking elements coacting with the drum and adapted to be actuated by movements of the sleeve, substantially as described.

2. In a brake mechanism of the type described, in combination with a fixed axle, a pivoted knuckle and its associated axle with the wheel hub and drum rotatably mounted thereon, a vertical knuckle pin rigidly secured to the knuckle in coincidence with the axis thereof, a rigidly mounted fixed cam member through which the knuckle pin passes, an actuating cam member loosely mounted upon the knuckle pin, a sleeve on the knuckle pin adapted to be moved longitudinally thereof by the engagement of the movable cam member, braking elements coacting with the drum and adapted to be actuated by movements of the sleeve, an anchor slidably mounted on the lower end of the knuckle pin and connected with the braking elements, and upper and lower springs for releasing the braking elements, substantially as described.

3. In a brake mechanism of the type described, in combination with a fixed axle, a pivoted knuckle and its associated axle with the wheel hub and drum rotatably mounted thereon, a vertically disposed knuckle pin rigidly secured to the knuckle and rotatable therewith, a rigidly mounted fixed cam member through which the pin passes, an actuating cam member coacting with the fixed cam member and freely embracing the pin, a sleeve engaging the fixed cam member and keyed to the pin and slidable thereon, a brake band split at a point adjacent to said sleeve, and toggle connections between the sleeve and the free ends of the brake band, substantially as described.

4. In a brake mechanism of the type described, in combination with a fixed axle, a pivoted knuckle and its associated axle with the wheel hub and drum rotatably mounted thereon, a vertically disposed knuckle pin rigidly secured to the knuckle and rotatable therewith, a rigidly mounted fixed cam member through which the pin passes, an actuating cam member coacting with the fixed cam member and freely embracing the pin, a sleeve engaging the actuating cam member and keyed to the pin and slidable thereon, a brake band split at a point adjacent to said sleeve, toggle connections between the sleeve and the free ends of the brake band, and an anchor slidably mounted upon the lower end of the knuckle pin and connected with the medial portion of the brake band, substantially as described.

5. In a brake mechanism of the type described, in combination with a fixed axle, a pivoted knuckle and its associated axle with the wheel hub and drum rotatably mounted thereon, a vertically disposed knuckle pin rigidly secured to the knuckle and rotatable therewith, a fixed cam member through which the pin passes, an actuating cam member coacting with the fixed cam member and freely embracing the pin, a sleeve keyed to the pin and slidable thereon, a brake band split at a point adjacent to said sleeve, toggle connections between the sleeve and the free ends of the brake band, an anchor slidably mounted upon the lower end of the knuckle pin and connected with the medial portion of the brake band, an upper spring connecting the free ends of the brake band, and a lower spring bearing against the anchor and serving normally to lift the same upon the pin, the two springs acting to release the brake band from contact with the drum, substantially as described.

6. In a brake mechanism of the type described, in combination with a fixed axle, a pivoted knuckle and its associated axle with the wheel hub and drum rotatably mounted thereon, a rigidly mounted fixed cam and an actuating cam, the two cams having complementary spirally cut coacting faces for maintaining coincidence of contact in all positions of adjustment, a knuckle pin rigidly connected to and rotatable with the knuckle and occupying a position in coincidence with the axis thereof, said pin being freely entered through said cams, braking mechanism associated with the drum, and connections between said braking mechanism and said cam mechanism for imparting braking actions occasioned by the adjustment of the actuating cam, substantially as described.

FRANK A. SHULER.